United States Patent [19]

Bearden, Jr. et al.

[11] Patent Number: 4,604,190
[45] Date of Patent: Aug. 5, 1986

[54] HYDROCRACKING WITH CHROMIC ACID AND AN ALIPHATIC POLYHYDROXY COMPOUND

[75] Inventors: Roby Bearden, Jr.; Clyde L. Aldridge, both of Baton Rouge, La.

[73] Assignee: Exxon Research and Engineering Co., Florham Park, N.J.

[21] Appl. No.: 762,764

[22] Filed: Aug. 5, 1985

Related U.S. Application Data

[62] Division of Ser. No. 728,485, Apr. 29, 1985, Pat. No. 4,567,167.

[51] Int. Cl.$^4$ .............................................. C10G 47/12
[52] U.S. Cl. ....................................... 208/112; 208/108
[58] Field of Search ............................ 208/112 L, 108

[56] References Cited

U.S. PATENT DOCUMENTS 4,357,229 11/1982 Bearden, Jr. et al. .......... 208/112 L
4,424,110 1/1984 Bearden, Jr. et al. .......... 208/112 L Primary Examiner—John Doll
Assistant Examiner—Lance Johnson
Attorney, Agent, or Firm—Marthe L. Gibbons

[57] ABSTRACT

A catalyst is prepared by adding a water soluble aliphatic polyhydroxy compound such as a polyhydroxy alcohol or a carbohydrate (e.g., sucrose) to an aqueous solution of chromic acid and subsequently introducing the resulting mixture into a hydrocarbon material. The hydrocarbon-containing mixture is heated in the presence of hydrogen sulfide to convert the chromium catalyst precursor to a solid chromium-containing catalyst. Hydroconversion processes utilizing the catalyst to convert oil, coal, and mixtures thereof are also provided.

8 Claims, 1 Drawing Figure

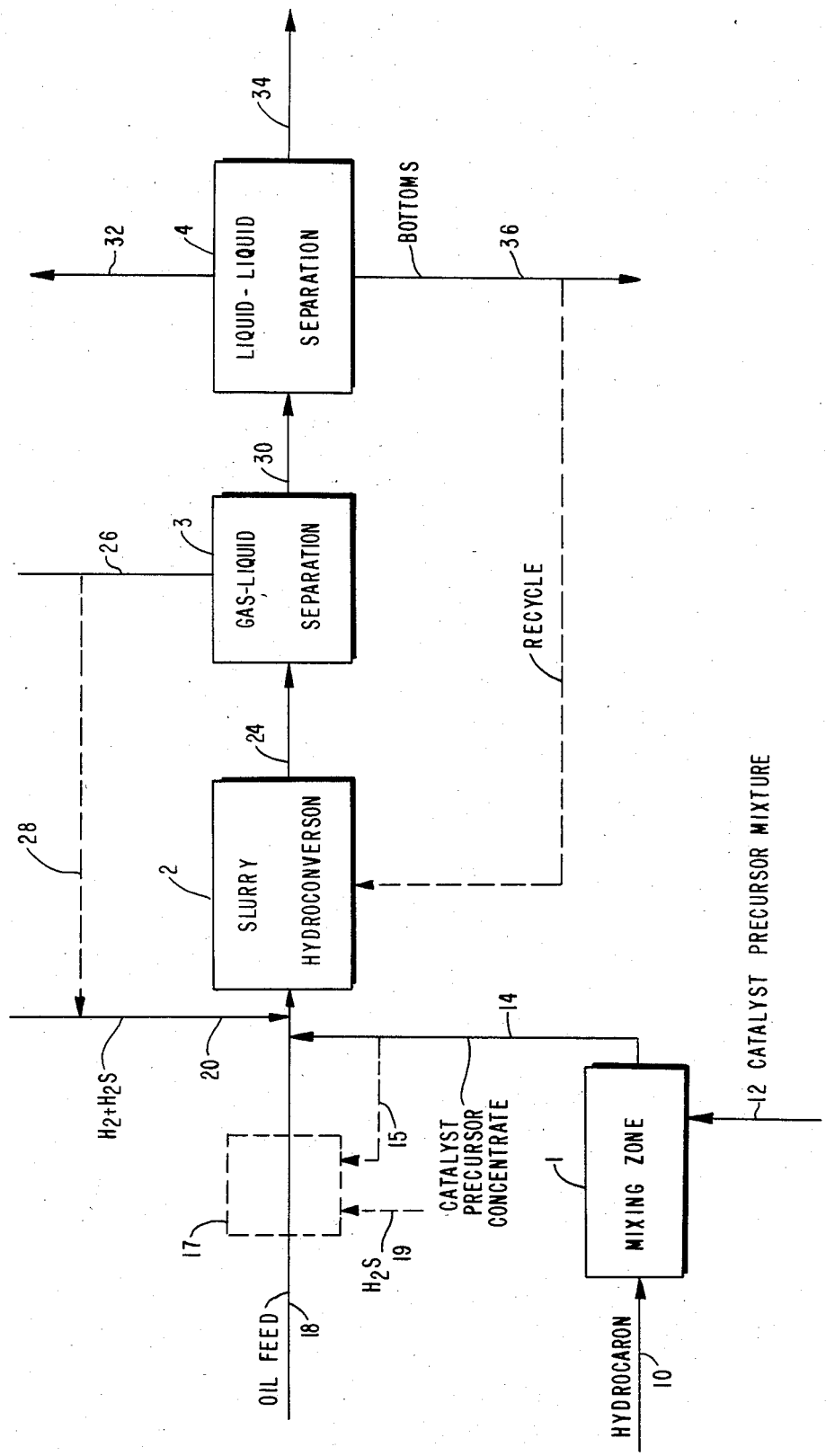

HYDROCRACKING WITH CHROMIC ACID AND AN ALIPHATIC POLYHYDROXY COMPOUND

This is a division of application Ser. No. 728,485, filed Apr. 29, 1985, now U.S. Pat. No. 4,567,167.

BACKGROUND OF THE INVENTION

1. Field of the Invention

This invention relates to catalysts characterized by their method of preparation and to their use in processes for hydroconverting carbonaceous materials such as hydrocarbonaceous oils and coal.

2. Description of Information Disclosures

Slurry hydroconversion processes utilizing a catalyst prepared in a hydrocarbon oil from a thermally decomposable or oil soluble metal compound catalyst precursor including chromium compounds are known. See, for example, U.S. Pat. No. 4,226,742 and 4,244,839.

It is also known to use such catalysts in hydroconversion processes (i.e., coal liquefaction) in which coal particles are slurried in a hydrocarbonaceous material. See, for example, U.S. Pat. No. 4,077,867.

The term "hydroconversion" with reference to a hydrocarbonaceous oil is used herein to designate a catalytic process conducted in the presence of hydrogen in which at least a portion of the heavy constituents of the oil is converted to lower boiling hydrocarbon products while it may simultaneously reduce the concentration of nitrogeneous compounds, sulfur compounds and metallic constituents.

The term "hydroconversion" with reference to coal is used herein to designate a catalytic process conducted in the presence of hydrogen wherein coal is converted to normally liquid hydrocarbon products.

All boiling points referred to herein are atmospheric pressure equivalent boiling points unless otherwise specified.

It has now been found that the addition of an aliphatic polyhydroxy compound to an aqueous solution of chromic acid ($CrO_3$) to form a catalyst precursor mixture which is subsequently added to a hydrocarbon medium and converted to a solid catalyst under certain conditions in the hydrocarbon medium will produce a novel catalyst that will yield less coke when used in hydroconversion processes.

SUMMARY OF THE INVENTION

In accordance with the invention, there is provided a catalyst prepared by the steps which comprise:
(a) adding a water soluble aliphatic polyhydroxy compound to an aqueous solution of chromic acid ($CrO_3$);
(b) forming a mixture of a hydrocarbon material and at least a portion of the mixture resulting from step (a); and
(c) heating the mixture resulting from step (b) in the presence of a hydrogen sulfide-containing gas at conditions to produce a slurry comprising said hydrocarbon material and a solid chromium-containing catalyst.

In accordance with the invention, there is also provided a hydroconversion process utilizing the above given catalyst.

BRIEF DESCRIPTION OF THE DRAWING

The FIGURE is a schematic flow plan of one embodiment of the invention.

DETAILED DESCRIPTION OF THE INVENTION

The catalyst of the present invention is prepared by first adding a water soluble aliphatic polyhydroxy compound to an aqueous solution of chromic acid ($CrO_3$) to form a catalyst precursor mixture, and subsequently mixing at least a portion of the resulting catalyst precursor mixture with a hydrocarbonaceous material and heating the resulting mixture in the presence of a hydrogen sulfide-containing gas to convert the chromium catalyst precursor to a solid chromium-containing catalyst. The term "aliphatic polyhydroxy compound" is used herein to designate an organic aliphatic compound containing more than one hydroxyl group. Suitable water soluble aliphatic polyhydroxy compounds include polyhydroxy alcohols, carbohydrates, and mixtures thereof such as, for example, sucrose, partially hydrolyzed cellulose, glycerol (1, 2, 3-propanetriol) and mixtures thereof. The aliphatic polyhydroxy compound is suitably added to the solution of chromic acid in an amount ranging from about 0.1 to 10, preferably from about 0.5 to 2 moles per mole chromic acid ($CrO_3$).

The hydrocarbonaceous materials to which the mixture of aliphatic polyhydroxy compound and aqueous chromic acid is added to form a second mixture include hydrocarbons boiling above about 350° F., preferably, hydrocarbonaceous oils comprising constituents boiling above 1050° F., more preferably having at least 10 wt.% constituents boiling above 1050° F., such as crude oils, atmospheric residua boiling above 650° F. and vacuum residua boiling above 1050° F. Preferably, the hydrocarbonaceous oil has an initial boiling point above at least 650° F. The hydrocarbonaceous material may be derived from any source, such as petroleum, shale oil, tar sand oil, products derived from coal liquefaction processes and mixtures thereof. A hydrogen sulfide-containing gas is introduced into the mixture of hydrocarbon, aliphatic polyhydroxy compound and aqueous chromic acid. The hydrogen sulfide-containing gas may comprise from about 1 to about 100 mole percent hydrogen sulfide. Preferably, the gas comprises hydrogen and from about 1 to 90 mole % hydrogen sulfide, based on the total gas. The mixture of hydrocarbon comprising the polyhydroxy compound and aqueous chromic acid is treated in the presence of the hydrogen sulfide-containing gas at a temperature of at least 500° F., preferably at a temperature ranging from about 500° to 1000° F., more preferably at a temperature ranging from about 700° to about 800° F. and a total pressure ranging from about 50 to about 5000 psig, preferably a pressure ranging from about 100 to about 2000 psig to convert the chromium-containing catalyst precursor to a solid chromium-containing catalyst dispersed in the hydrocarbon medium in which it is being prepared. The hydrocarbon medium in which the catalyst precursor is converted to the solid chromium containing catalyst may be a hydrocarbon contained in a carbonaceous chargestock of a hydroconversion process. For example, when a hydrocarbonaceous oil is to be hydroconverted, the catalyst precursor is converted to the solid chromium-containing catalyst in the hydrocarbonaceous oil that will be used as chargestock for the hydroconversion process. In coal liquefaction processes, wherein the carbonaceous chargestock comprises coal and a hydrocarbon diluent, the mixture of aliphatic polyhydroxy compound and aqueous chromic acid (catalyst precursor mixture) may be added to the hydrocarbon diluent and converted therein to the solid catalyst, preferably prior to introducing the coal in the diluent. As a first alternative, the catalyst precursor mixture may be added to the hydrocarbon that is of the same type as the one that will be used as chargestock for the hydroconversion process or the catalyst precursor mixture may be in a hydrocarbon medium that is different from the hydrocarbon that will be present in the carbonaceous chargestock of the hydroconversion process. The catalyst precursor mixture in the hydrocarbon medium may be added to a hydrocarbon-containing carbonaceous chargestock of a hydroconversion process and, thereafter, converted to the solid chromium-containing catalyst in the chargestock. The solid catalyst may be separated from the hydrocarbon medium in which it had been prepared and the recovered solid catalyst may be used as catalyst. The chromium-containing catalyst precursor is suitably added to the hydrocarbon medium in an amount to provide from 0.001 to 2 wt.% Cr, calculated as elemental chromium, based on the hydrocarbon medium. When a catalyst precursor concentrate is prepared (rather than introducing the catalyst precursor mixture into the chargestock), then preferably the amount of chromium-containing catalyst precursor introduced into the hydrocarbon medium ranges from about 0.05 to 2 wt.%, preferably from 0.1 to 2 wt.%, calculated as elemental chromium, based on the hydrocarbon medium. The separated solid catalyst or the solid catalyst dispersed in the hydrocarbon medium is suitable for use in processes for the hydroconversion of hydrocarbonaceous oils, hydroconversion of coal (i.e., coal liquefaction) and the simultaneous hydroconversion of coal and hydrocarbonaceous oils.

Suitable hydroconversion operating conditions for converting a hydrocarbonaceous oil to lower boiling products are summarized in Table I.

TABLE I

| Conditions | Broad Range | Preferred Range |
|---|---|---|
| Temp., °F. | 600–1000 | 800–900 |
| H$_2$ Partial Pressure, psig | 50–5000 | 300–2000 |

Suitable hydroconversion conditions for coal liquefaction in which the chargestock comprises coal in a hydrocarbon diluent are summarized in Table II.

TABLE II

| Conditions | Broad Range | Preferred Range |
|---|---|---|
| Temp., °F. | 500–900 | 750–860 |
| Total Pressure, psig | 500–7000 | 1150–2500 |
| H$_2$ Partial Pressure, psig | 400–5000 | 1000–1600 |

Suitable hydrocarbon-containing carbonaceous chargestocks for the hydroconversion processes utilizing the catalyst of the present invention include hydrocarbonaceous oils, coal and mixtures thereof. Suitable hydrocarbonaceous oil chargestocks include mineral oils; mixtures of hydrocarbons boiling above 430° F., preferably above 650° F.; whole or topped petroleum crude oils, including heavy crude oils; once through coker bottoms; asphaltenes; residual oils such as atmospheric residua boiling above about 650° F.; petroleum vacuum residua boiling above 1050° F.; bitumen; tar sand oils; shale oils; hydrocarbonaceous oils derived from coal liquefaction processes, including coal liquefaction bottoms and mixtures thereof; coal, coal slurries such as slurries of coal in a hydrocarbon diluent, and mixtures thereof. The term "coal" is used herein to designate normally solid carbonaceous material including all ranks of coal, such as anthracite coal, bituminous coal, semi-bituminous coal, sub-bituminous coal, lignite, peat and mixtures thereof.

DESCRIPTION OF THE PREFERRED EMBODIMENT

Referring to the FIGURE, a heavy hydrocarbonaceous oil is introduced by line 10 into mixing zone 1. Suitable heavy hydrocarbonaceous oils for introduction into zone 1 include hydrocarbonaceous oils comprising constituents boiling above 1050° F., preferably having at least 10 wt. % constituents boiling above 1050° F., such as crude oils, atmospheric residua boiling above 650° F., vacuum residua boiling above 1050° F. Preferably, the hydrocarbonaceous oil has an initial boiling point above at least 650° F. and comprises asphaltenes. Most preferably, the hydrocarbonaceous oil is a blend of at least two hydrocarbonaceous oils, namely, a lighter boiling oil having a boiling point below about 975° F. and a heavier oil having a boiling point above 975° F. and a blend comprising at least about 10 wt. %, preferably at least about 25 wt. % materials boiling above 1050° F. Preferred concentrations of the heavy oil in the blend include from about 25 to 90 wt.% heavy oil, preferably 45 to 90 wt. % heavy oil, most preferably from 45 to 75 wt. % heavy oil, based on the weight of the blend (mixture of oils). The light oil may be a gas oil and the heavy oil may be a vacuum residuum. Alternatively, an atmospheric residuum having the appropriate amount of desired constituents may be used as the oil of line 10. The hydrocarbonaceous oil carried in line 10 may be derived from any source, such as petroleum, tar sand oil, shale oil, liquids derived from coal liquefaction processes and mixture of any of these oils. Generally these oils have a Conradson carbon content ranging from about 5 to 50 wt. % (as to Conradson carbon content, see ASTM Test D-189-65). A catalyst precursor mixture is introduced into mixing zone 1 by line 12. The catalyst precursor mixture comprises an aqueous solution of chromic acid (CrO$_3$) to which a water soluble aliphatic polyhydroxy compound, for example, sucrose, has been added.

A sufficient amount of catalyst precursor mixture is introduced into mixing zone 1 to form a catalyst precursor concentrate, that is, a mixture comprising from about 0.05 to 2, preferably from about 0.1 to 1, more preferably from about 0.2 to 1 wt. % chromium calculated as elemental metal, based on the weight of the hydrocarbonaceous oil in the mixture. The catalyst precursor concentrate is passed by line 14 into line 18 which carries a hydrocarbonaceous oil chargestock. Alternatively, the catalyst precursor concentrate may be passed by line 15 into a heating zone 17 into which the oil feed of line 18 is also introduced. In heating zone 17, a hydrogen sulfide-containing gas is introduced by line 19. The gas introduced into zone 17 may comprise from about 1 to 100 mole % hydrogen sulfide. Preferably the hydrogen sulfide-containing gas also comprises hydrogen. More preferably, the hydrogen sulfide-containing gas comprises hydrogen and from about 1 to about 90 mole percent hydrogen sulfide based on the total gas. Heating zone 17 is operated at the conditions previously described as being suitable for conversion of the catalyst precursor to the solid chromium-containing catalyst. Thereafter, the oil chargestock comprising the solid catalyst is passed into slurry hydroconversion zone 2. In the preferred embodiment, the catalyst precursor concentrate is passed directly by line 14 into oil feed line 18. The catalyst precursor concentrate disperses in the oil chargestock. Suitable hydrocarbonaceous chargestocks include crude oils, mixture of hydrocarbons boiling above 430° F., preferably above 650° F., for example, gas oils, vacuum residua, atmospheric residua, once through coker bottoms, and mixtures thereof. The hydrocarbonaceous oil may be derived from any source, such as petroleum, shale oil, tar sand oil, oils derived from coal liquefaction processes, including coal liquefaction bottoms, and mixtures thereof. Preferably, the hydrocarbonaceous oils have at least 10 wt. % materials boiling above 1050° F., more preferably, the hydrocarbonaceous oils have a Conradson carbon content ranging from about 5 to about 50 wt. %.

A hydrogen-containing gas is introduced by line 20 into line 18. In the preferred embodiment in which the solid catalyst has not been formed in heating zone 17, the hydrogen-containing gas also comprises hydrogen sulfide in an amount ranging from about 1 to 10 mole %. The mixture of hydrocarbonaceous chargestock, catalyst precursor concentrate, hydrogen and $H_2S$ is passed by line 18 into slurry hydroconversion zone 2. The catalyst precursor concentrate of line 14 is added to the hydrocarbonaceous chargestock in an amount sufficient to provide from about 10 to about 2000 wppm chromium, preferably from about 50 to about 1000 wppm chromium, calculated as elemental metal based on the total hydroconversion zone chargestock, i.e., concentrate plus hydrocarbonaceous chargestock.

The catalyst precursor is converted to the solid catalyst in hydroconversion zone 2 either by being heated to a temperature below hydroconversion temperature prior to the hydroconversion reaction or the catalyst precursor is converted to the solid chromium catalyst at hydroconversion conditions.

Suitable slurry hydroconversion operating conditions are those summarized in Table I.

The hydroconversion zone effluent is removed by line 24 and passed to a gas-liquid separation zone 3 wherein the normally gaseous phase is separated from a normally liquid phase. The gaseous phase is removed from separation zone 3 by line 26. Alternatively, the gaseous phase, which comprises hydrogen, may be recycled by line 28, preferably after removal of undesired constituents to slurry hydroconversion zone 2 via line 20. The normally liquid phase, which comprises catalytic solids and a hydroconverted, hydrocarbonaceous oil product, is passed by line 30 to separation zone 4 for fractionation by conventional means, such as distillation into various fractions, such as light, medium boiling and heavy bottoms fractions. The light fraction is removed by line 32. The medium fraction is removed by line 34. The heavy bottoms fraction comprising catalytic solids is removed by line 36 and, if desired, at least a portion of the bottoms fraction may be recycled to hydroconversion zone 2. The catalytic solids may also be separated from the oil product and the separated solids recycled to hydroconversion zone 2.

The following examples are presented to illustrate the invention:

EXAMPLE 1

(Comparative) Preparation of Catalyst Precursor Concentrate Comprising $CrO_3$ in Atmospheric Residuum A solution of chromic acid was prepared by dissolving 2.50 g of crystalline $CrO_3$ in 47.50 g of deionized water.

A 300 ml Autoclave Engineers stirred autoclave was then charged at room temperature with 7.70 g of this chromic acid solution and with 100 g of a heavy Arabian atmospheric residuum, which had an initial boiling point of 650° F. and which contained 48 wt.% material boiling above 1050° F. and 11.9 wt.% of Conradson carbon components.

The autoclave was flushed with nitrogen, pressured to 100 psig with nitrogen and heated with stirring from room temperature to 304° F. for a 10 minute period, whereupon the autoclave pressure was released and an ensuing stirred contact period of 10 minutes was carried out with nitrogen flowing through the autoclave to remove the water that had been charged with the chromic acid solution.

The autoclave was then cooled to room temperature and the resultant precursor concentrate (0.2 wt. % Cr) discharged and stored under nitrogen.

EXAMPLE 2

(Comparative) Preparation of Catalyst Precursor Concentrate Comprising $CrO_3$ in Atmospheric Residuum The procedure for Example 1 was followed for this preparation with the exception that the chromic acid solution was made up of 1.0 g of $CrO_3$ in 24.0 g of deionized water and that the autoclave charge consisted of 10.0 g of this solution with 100.0 g of heavy Arabian atmospheric residuum.

The resultant, dewatered precursor concentrate contained 0.21 wt.% Cr.

EXAMPLE 3

Preparation of Catalyst Precursor Concentrate Comprising Sucrose-Modified $CrO_3$ in Atmospheric Residuum A precursor solution was prepared by first dissolved 3.42 g (0.01 mole) of sucrose in 20.58 g of deionized water and then adding, at room temperature and with stirring, 1.00 g (0.01 mole) of crystalline $CrO_3$. The solution was allowed to stand overnight (about 17 hrs.) prior to use.

A 300 ml Autoclave Engineers stirred autoclave was then charged with 10 g of the sucrose/$CrO_3$ solution and 100 g of the heavy Arabian atmospheric residuum described in Example 1, and preparation of the precursor concentrate was carried out according to the procedure of Example 1.

The resultant, precursor concentrate contained 0.20 wt. % Cr.

EXAMPLE 4

Preparation of Catalyst Precursor Concentrate Comprising Sucrose-Modified $CrO_3$ in Atmospheric Residuum This precursor concentrate was prepared according to the procedures described in Example 3 with the exception that the precursor solution of sucrose and $CrO_3$ in water was allowed to stand 1 hour prior to use in concentrate formation.

EXAMPLE 5

Preparation of Catalyst Precursor Concentrate Comprising Sucrose-Modified $CrO_3$ in Atmospheric Residuum This catalyst precursor concentrate was prepared according to the procedures given in Example 3 with the exception that the amount of sucrose in the precursor solution was increased. The solution for the present example consisted of 4.42 g (0.013 mole) of sucrose and 1.0 g (0.01 mole) of $CrO_3$ dissolved in 19.58 g of deionized water.

The autoclave charge for concentrate preparation consisted of 10.0 g of solution and 100 g of heavy Arabian atmospheric residuum, and the resultant, dewatered concentrate contained 0.2 wt.% Cr.

EXAMPLE 6

Hydroconversion Experiments Comparing Precursor Concentrates

The effectiveness of precursor concentrates prepared using sucrose-modified solutions of $CrO_3$ in water (Examples 3, 4, 5 which are in accordance with the present invention) relative to those prepared using solutions of $CrO_3$ in water (Examples 1 and 2) was determined in hydroconversion experiments that were carried out in the following manner:

A 300 ml Autoclave Engineers stirred autoclave was charged at room temperature with 21 g of catalyst precursor concentrate, an amount that furnished 350 wppm Cr on the total autoclave charge of hydrocarbonaceous materials, which comprised the precursor concentrate and 99 g of a heavy Arabian vacuum residuum. The vacuum residuum feed contained 88.6 wt.% of material boiling above 975° F. and 21.1 wt.% of Conradson carbon components.

After charging the precursor concentrate and residuum feed, the autoclave was flushed with nitrogen and heated with stirring from room temperature to 158° F. for a 15 minute stirred contact.

The autoclave was then cooled to room temperature, flushed with hydrogen, charged with 50 psia $H_2S$ and 1365 psia $H_2$, and then heated with stirring from room temperature up to 725° F. for a stirred contact period of 20 minutes.

Upon completion of the 20 minute contact, a flow of $H_2$ was started through the autoclave and the autoclave was heated to the hydroconversion reaction temperature of 830° F. where it was held with stirring for a period of 180 minutes. Autoclave pressure during this reaction period was 2100 psig and the gas flow (measured at the reactor outlet at room temperature and atmospheric pressure) was 0.36 liters/minute.

The autoclave was then cooled, gaseous products were removed and collected for composition analysis by mass spectrometry. Liquid and solid products remaining in the reactor were removed by washing with toluene and the toluene wash then filtered to recover toluene insoluble solids. The solids were subsequently vacuum oven dried and analyzed to determine the fraction of carbon contained. Coke yield is based on the carbon fraction recovered and is calculated as shown in Equation (1).

The toluene filtrate that contained oil products was stripped to remove toluene and then vacuum distilled to determine the amount of unconverted 975+° F. material, which value was used to calculate the conversion of 975+° F. feed as shown in Equation (2). In the conversion calculation of Equation (2), coke is included as unconverted feed.

Unconverted Conradson carbon was determined by assay of the 975° F. distillation residue (ASTM Test D-189-65) and Conradson carbon conversion was calculated as shown in Equation (3).

Results of the hydroconversion experiments (Table III) showed that chromium catalyst precursor concentrates that were prepared from chromic acid solutions to which sucrose had been added (Experiments R-1640, R-1646 and R-1645) gave hydroconversion results that were superior (less coke and higher conversion) than obtained when the precursor concentrate was prepared with sucrose-free chromic acid solutions (Experiments R-1618 and R-1644). Further, for the sucrose-modified preparation, performance was improved by aging the chromic acid-sucrose solution prior to mixing with residuum to form the precursor concentrate (compare Experiments R-1640 and R-1646).

$$\text{Coke Yield, \%} = \frac{\text{g. toluene insoluble solids} \times \text{wt. fraction carbon}}{\text{g. vacuum residuum} \times 0.85^*} \times 100 \quad \text{Equation (1)}$$

$$975+° \text{ F. Conv., \%} = \frac{\text{g. 975}+° \text{ F. feed} - (\text{g. 975}+° \text{ F. distillation residue} + \text{g. coke})}{\text{g. 975}+° \text{ F. feed}} \times 100 \quad \text{Equation (2)}$$

$$\text{Con. Carbon Conv., \%} = \frac{\text{g. Con. Carbon charged} - \text{g. Con. Carbon recovered}}{\text{g. Con. Carbon charged}} \times 100 \quad \text{Equation (3)}$$

*This is an empirical factor for converting grams carbon to grams coke.

TABLE III

| COMPARISON OF EFFECTIVENESS OF CHROMIUM PRECURSOR CONCENTRATES IN HYDROCONVERSION OF HEAVY ARAB VACUUM RESIDUUM | | | | | |
|---|---|---|---|---|---|
| Experiment No. | R-1618 | R-1644 | R-1640 | R-1646 | R-1645 |
| Precursor Concentrate of: | Example 1 | Example 2 | Example 3 | Example 4 | Example 5 |
| Ratio moles sucrose/$CrO_3$ | No sucrose | | 1.0 | 1.0 | 1.3 |
| Precursor solution age, Hr. | 1 | 1 | 17 | 1 | 17 |
| Coke yield, wt. % on vacuum residuum | 6.1 | 4.0 | 2.9 | 3.3 | 2.9 |
| 975+° F. Conv., % | 80.3 | 81.7 | 83.1 | 83.6 | 82.8 |
| Conradson Carbon Conv. % | 62.3 | 61.1 | 62.1 | 64.2 | 62.2 |

What is claimed is:

1. A process for hydroconverting a hydrocarbonaceous oil chargestock to produce a hyroconverted hydrocarbonaceous oil product which comprises: reacting said hydrocarbonaceous oil chargestock with hydrogen at a hydrogen partial pressure ranging from about 50 to about 5000 psig, in the presence of a catalyst at hydroconversion conditions, including a temperature ranging from about 500° to about 1000° F., said catalyst having been prepared by the steps which comprise:
   (a) adding a water soluble aliphatic polyhydroxy compound to an aqueous solution of chromic acid ($CrO_3$);
   (b) introducing at least a portion of the mixture resulting from step (a) into said hydrocarbonaceous oil chargestock; and
   (c) heating the mixture resulting from step (b) in the presence of a hydrogen sulfide-containing gas at conditions to produce a slurry comprising a solid chromium-containing catalyst.

2. The process of claim 1 wherein said aliphatic polyhydroxy compound is selected from the group consisting of polyhydroxy alcohols, carbohydrates, and mixtures thereof.

3. The process of claim 1 wherein said aliphatic polyhydroxy compound is selected from the group consisting of sucrose, partially hydrolyzed cellulose, glycerol, and mixtures thereof.

4. The process of claim 1 wherein said aliphatic hydroxy compound is added to step (a) in an amount ranging from about 0.1 to 10 moles per mole $CrO_3$.

5. The process of claim 1 wherein prior to step (b), the mixture resulting from step (a) is mixed with a hydrocarbon and the resulting mixture is introduced into said hydrocarbonaceous oil chargestock.

6. The process of claim 1 wherein said solid chromium-containing catalyst is separated from said slurry and wherein the separated catalyst is added to said hydrocarbonaceous oil chargestock.

7. The process of claim 1 wherein said conditions of step (c) include a temperature ranging from about 500° to about 1000° F. and a total pressure ranging from about 50 to about 5000 psig.

8. The process of claim 1 wherein said hydrogen sulfide-containing gas also comprises hydrogen.

* * * * *